United States Patent
Schwertberger

(10) Patent No.: US 6,374,949 B2
(45) Date of Patent: *Apr. 23, 2002

(54) TRANSMISSION

(75) Inventor: Helmut Schwertberger, Augsburg (DE)

(73) Assignee: Renk Aktiengesellschaft, Augsburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/472,856

(22) Filed: Dec. 27, 1999

(30) Foreign Application Priority Data

Dec. 28, 1998 (DE) .......................... 198 60 353

(51) Int. Cl.⁷ ................................................ F01M 1/18
(52) U.S. Cl. .......................................... 184/6.4; 74/467
(58) Field of Search ................... 184/6.4, 107; 74/467, 74/606 R, 606 A

(56) References Cited

U.S. PATENT DOCUMENTS

| | | | |
|---|---|---|---|
| 3,489,034 A | * | 1/1970 | Moore ....................... 74/606 R |
| 3,790,155 A | * | 2/1974 | Longamore .................. 74/18.1 |
| 4,051,920 A | * | 10/1977 | Reinsma ...................... 184/6.4 |
| 4,192,203 A | * | 3/1980 | Dailey ........................ 74/337.5 |
| 4,322,030 A | * | 3/1982 | Jacobson et al. ........... 184/6.18 |
| 4,399,774 A | * | 8/1983 | Tsutsumi .................... 123/41.1 |
| 4,825,720 A | * | 5/1989 | Capdepuy ..................... 74/468 |
| 4,848,518 A | * | 7/1989 | Ornberg et al. ............ 184/6.12 |
| 4,872,530 A | * | 10/1989 | Burgess ..................... 184/6.12 |
| 5,046,583 A | * | 9/1991 | Sasaki et al. ................. 184/6.4 |
| 5,147,015 A | * | 9/1992 | Snuttjer et al. .............. 184/6.4 |
| 5,310,020 A | * | 5/1994 | Martin et al. ................. 184/6.4 |
| 5,511,524 A | * | 4/1996 | Kidera et al. ................. 184/7.4 |
| 5,749,267 A | * | 5/1998 | Kock ........................... 74/467 |
| 5,860,331 A | * | 1/1999 | Hashimoto et al. ........... 74/640 |
| 5,921,350 A | * | 7/1999 | Tsai ............................. 184/6.4 |
| 5,950,501 A | * | 9/1999 | Deeg et al. ................ 74/606 R |

FOREIGN PATENT DOCUMENTS

EP 411 294 9/1992

OTHER PUBLICATIONS

Article taken from CIMAC Congress 1998 Copenhagen entitled "High Efficiency Turbogears For Gas Turbines First Operating Experiences" by Schloms, et al., pp. 537–543.
Pages taken from BOSCHentitled "Kraftfahr Technisches Taschenbuch" by Ulrich Adler, VDI–Verl., 1991, 3 pp and English language version of German p. 548.
Letter (2pgs) and 2 sheets of drawings from Siemens to Neckarwerke Energieversorgungs, Apr. 4, 1996.
Article taken from MAAG Getriebe AG entitled Systemtechnischer Konzeptentwurf eines MAAG–HET—Getriebes (High Efficiency Turbo–Gear), dated Mar. 21, 199612pp.
Article taken from MAAG Gear AG dated Oct. 15, 1996 entitled "Aufbau und Funktion" 12 pp. and revisions.
Drawing from MAAG Getriebe of "GD–72, 5 HET Systemplan" 1996.

* cited by examiner

Primary Examiner—David A. Bucci
Assistant Examiner—Cheng H. Kim
(74) Attorney, Agent, or Firm—Cohen, Pontani, Lieberman & Pavane

(57) ABSTRACT

A transmission for the drive of generators by turbines. The transmission casing is under a partial vacuum, and the operation of the transmission is monitored and protected by special safety devices.

10 Claims, 2 Drawing Sheets

TRANSMISSION

BACKGROUND OF THE INVENTION

1. Field of the Invention

The invention relates to transmissions, and in particular for the drive of generators by turbines, in which the transmission casing is under a partial vacuum and the operation of the transmission is monitored and protected by special devices.

2. Description of the Related Art

It is generally known that in high-speed transmissions, the aerodynamic losses, compared with the friction, are greater. To reduce these windage losses, the air surrounding the rotating gears is completely or partly removed from this region. For this purpose, DE 295 17 964 U1 proposes an inner casing which closely surrounds the gears and is kept under partial vacuum by means of a pump. The installation of an inner casing involves additional effort which results in high costs. The feeds for lubricating and cooling oil must be passed through the inner casing in a complicated manner and the lubricating-oil sprinklers must be fastened in the interior of the inner casing. In the event of malfunctions at the scavenge pump, due to the small distance between the inner casing and the gears, the oil sump may rise rapidly up to the tooth flanks and lead to sudden braking of a gear, which results in considerable damage to the entire plant. A special dedicated inner casing is to be provided for every variation in the transmission ratio of the transmission and the accompanying change in the gear diameters.

SUMMARY OF THE INVENTION

It is therefore an object of the invention is to provide a transmission casing in which, at a low cost of the casing, a partial vacuum of predetermined size can be maintained and which ensures a high degree of operational safety.

This and other objects of the invention are achieved by dispensing with the additional inner casing in an advantageous manner and such that the technical outlay otherwise associated therewith does not apply. Due to the unobstructed interior space, the optimum arrangement of lubricating-oil sprinklers and scavenge devices in the configuration of the casing according to the invention is possible without extra technical outlay.

The variation of different transmission ratios in a transmission casing according to the invention is possible due to the omission of the close-fitting inner casing.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention and the prior art are explained in more detail in the drawings, in which, in detail.

DETAILED DESCRIPTION OF THE PRESENTLY PREFERRED EMBODIMENTS

Figure 1:
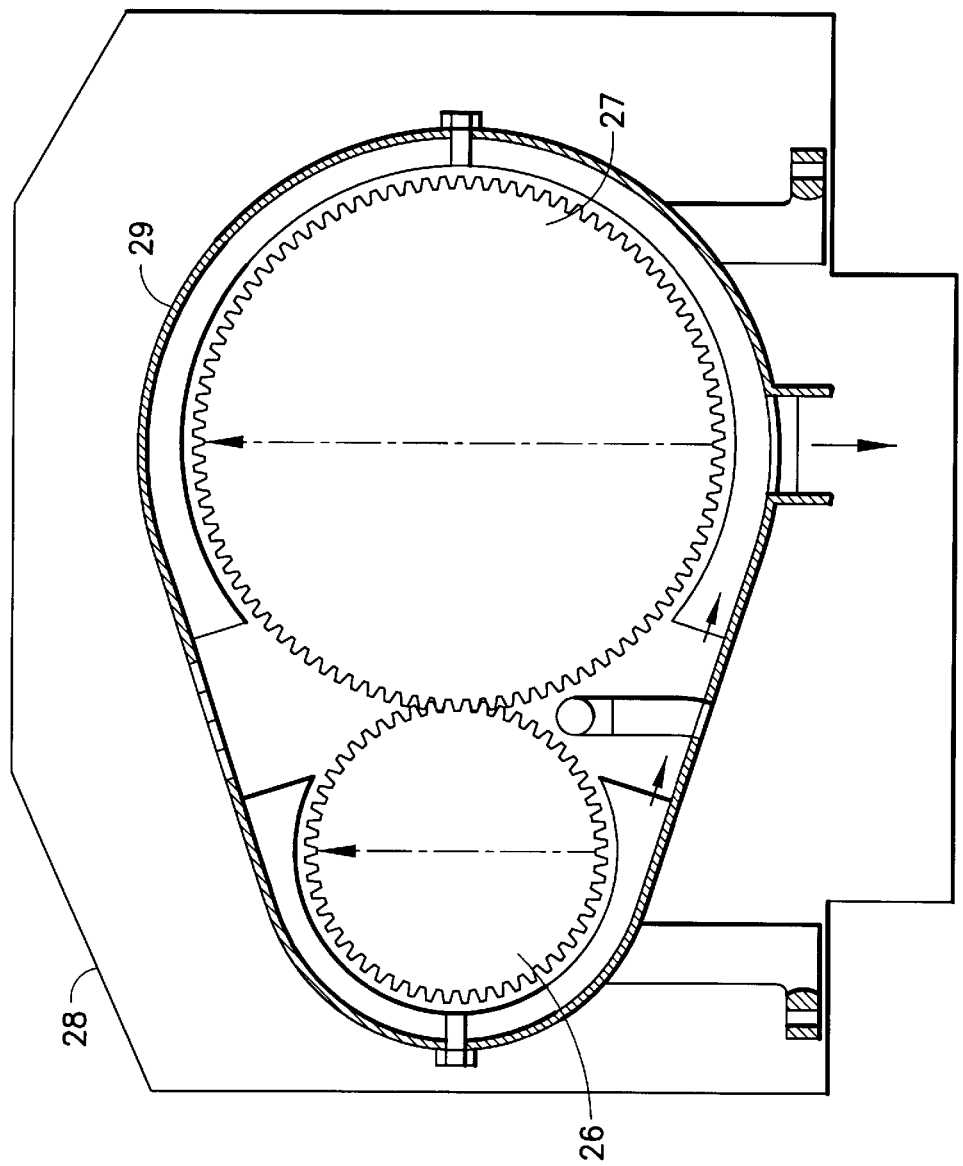
FIG. 1 is a longitudinal sectional view of prior art transmission casing with an inner casting.

An exemplary prior art embodiment is shown in FIG. 1. Arranged in a main casing (28) is a gear (26) which meshes with a gear (27). An inner casing (29), adapted to the outside diameter of the gears (26, 27) in a close-fitting manner, encloses this gear train. The inner casing is fastened to the main casing (29). A partial vacuum is produced in the interior space of the inner casing by means of a pump (not shown). The space between the inner casing (29) and the main casing (28) is under atmospheric pressure.

Figure 2:
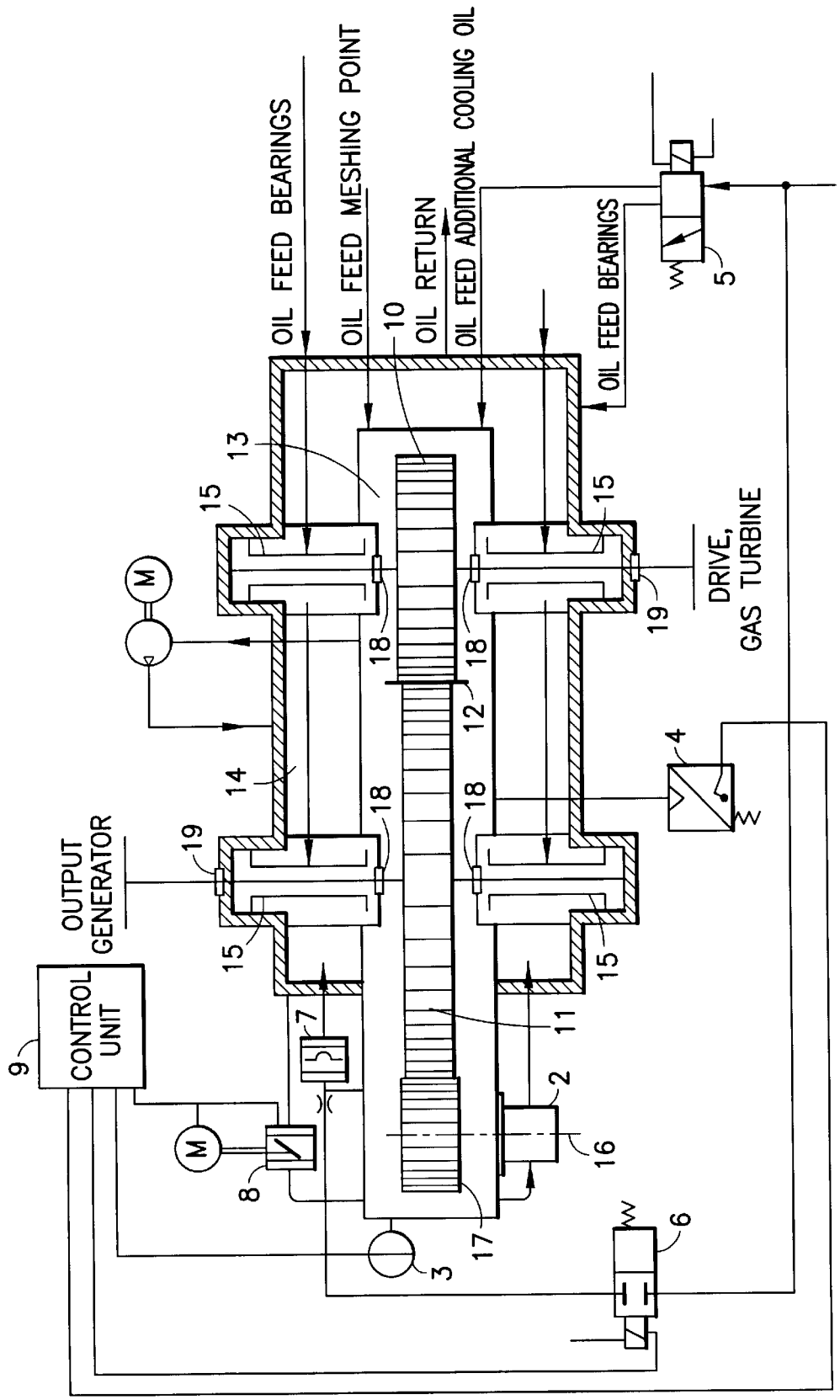
FIG. 2 is a schematic view of the basic structure of a design example according to the invention.

FIG. 2 shows the functional structure of a design example according to an embodiment of the invention. Arranged in the transmission interior space (13) are gears (10, 11), which intermesh at the meshing point (12). A partial vacuum is produced in the transmission interior space (13) by a vacuum pump (1) and is maintained for the operating period of the transmission. The partial vacuum is designated as the state in which there is still a slight air pressure in an interior space. The bearing region (14) of the casing is spatially separate from the transmission interior space (13) and is under atmospheric pressure. The bearings (15) inserted in the bearing region (14) are partitioned off from the partial vacuum of the transmission interior space (13) by seals (18). However, it is also possible to maintain the hydrodynamic lubricating function of the bearings (15) in the partial vacuum, so that in this case the seals (18) become superfluous. The exit points of the drive shaft and output shaft from the transmission casing are provided with oil seals (19) to prevent oil leakage. The meshing point (12) is lubricated by oil flows which are fed by oil sprinklers above and below the meshing point (12).

The oil quantities for the feed of lubricating and cooling oil are delivered by devices (not shown) which are also able to feed additional cooling-oil quantities. The oil collecting in the sump is delivered out of the casing by the oil scavenge pump (2).

The oil scavenge pump (2) is flanged to the casing wall and is driven by a gear (17) which is fastened to the pump shaft (16) and meshes with the gear (11) in the transmission interior space. The oil scavenge pump (2) is designed such that it is capable of delivering the additional cooling-oil quantity. This oil scavenge pump (2) may also be driven via an electric motor independent of the main transmission or directly by a shaft of the main transmission.

The safe operation of the transmission is ensured by automatic monitoring and safety devices. To this end, a pressure switch (4) for monitoring the internal pressure and a level switch (3) for controlling the oil level are provided in the transmission interior space (13)

As regulating devices for maintaining the operation in the event of a malfunction and for initiating safety measures in order to avoid damage to the transmission, a solenoid valve (5) is provided in order to regulate the inflow of additional cooling oil, and a motor-actuated shut-off flap (8), for discharging an excess quantity of oil, opens an additional outflow passage to the oil flow. If a second switching stage of the level switch (3) is tripped—by a further rise in the oil level—oil flow is directed to the bursting disk (7) via a solenoid valve (6), and this oil flow destroys the bursting disk (7) and thus opens a further oil drain.

The coordinated activation of the regulating devices and operation of the vacuum pump is effected by a battery-backed control unit (9). Due to the safety circuits in the control unit (9), it malfunctions are detected, the transmission continues to run automatically in normal operation, (i.e., under atmospheric pressure or with a poorer quality of partial vacuum). The control unit (9) controls the feed of additional cooling oil and the drawing-off or the discharge of the oil in these states affected by higher power loss.

The invention is not limited by the embodiments described above which are presented as examples only but can be modified in various ways within the scope of protection defined by the appended patent claims.

I claim:

1. A gear transmission running at least in a partial vacuum and having at least two intermeshing gears having gear shafts, the transmission comprising:

means for feeding at least one of a lubricating and a cooling oil into a meshing point of the gears;

bearings carrying the gear shafts and having seals, said seals adjoining the partial vacuum;

a first sensor disposed in the partial vacuum and adapted to record a pressure of the partial vacuum, said first sensor activating at least one of a plurality of safety devices in response to a detected deviation of pressure from a preset pressure range, said plurality of safety devices comprising at least one from a group consisting of additional oil cooling, opening a shut-off flap and turning off a vacuum pump;

a second sensor arranged in the partial vacuum and adapted to detect an oil quantity, said second sensor activating at least one of a further plurality of safety devices in response to the detected oil quantity, wherein said at least one of a further plurality of safety devices comprises draining oil via an oil drain; and a bursting disk adapted to direct oil flow for the oil drain.

2. The gear transmission according to claim 1, further comprising:

at least one vacuum pump for producing the partial vacuum; and at least one further pump for drawing off oil from the partial vacuum.

3. The gear transmission according to claim 1, further comprising at least one pump adapted to evacuate air to produce the partial vacuum and to draw off oil from the partial vacuum.

4. The gear transmission according to claim 2, wherein said at least one further pump further comprises a pump shaft and a gear arranged on the pump shaft and meshed with the one of the at least two gears of the transmission.

5. The gear transmission according to claim 2, further comprising at least one motor for driving said pumps.

6. The gear transmission according to claim 1, further comprising a battery-backed control unit for controlling said safety devices.

7. The gear transmission according to claim 1, wherein said second sensor comprises two switching stages, each switching stage being adapted to actuate different safety devices in accordance with the oil quantity in the casing.

8. The gear transmission according to claim 3, wherein said at least one pump further comprises a pump shaft and a gear arranged on the pump shaft and meshed with the one of the at least two gears of the transmission.

9. The gear transmission according to claim 3, further comprising at least one motor for driving said at least one pump.

10. A gear transmission running at least in a partial vacuum and having at least two intermeshing gears having gear shafts, the transmission comprising:

means for feeding at least one of a lubricating and a cooling oil into a meshing point of the gears;

bearings carrying the gear shafts;

a first sensor disposed in the partial vacuum and adapted to record a pressure of the partial vacuum, said first sensor activating at least one of a plurality of safety devices in response to a detected deviation of pressure from a preset pressure range, said plurality of safety devices comprising at least one from a group consisting of additional oil cooling, opening a shut-off flap and turning off a vacuum pump;

a second sensor arranged in a partial vacuum and adapted to detect an oil quantity, said second sensor activating at least one of a further plurality of safety devices in response to the detected oil quantity, wherein said at least one of a plurality of safety devices comprises draining oil via an oil drain; and a bursting disk adapted to direct oil flow for the oil drain.

* * * * *